(12) United States Patent
Venditti et al.

(10) Patent No.: US 6,408,877 B2
(45) Date of Patent: Jun. 25, 2002

(54) DIRECTIONAL CONTROL VALVE

(75) Inventors: Mario Venditti, Bologna; Luca Ibatici, Rivalta, both of (IT)

(73) Assignee: Bucher Hidroirma S.p.A., Reggio Emilia (IT)

( * ) Notice: Subject to any disclaimer, the term of this patent is extended or adjusted under 35 U.S.C. 154(b) by 0 days.

(21) Appl. No.: 09/733,923

(22) Filed: Dec. 12, 2000

(30) Foreign Application Priority Data

Dec. 14, 1999 (IT) .......................................... RE99A0134

(51) Int. Cl.[7] ............................................. F15B 13/044
(52) U.S. Cl. ..................... 137/596.17; 91/464
(58) Field of Search ........................ 91/464; 137/596.17

(56) References Cited

U.S. PATENT DOCUMENTS

| | | | | |
|---|---|---|---|---|
| 4,615,358 A | * | 10/1986 | Hammond et al. | 137/596.17 X |
| 4,617,967 A | * | 10/1986 | Read et al. | 137/596.17 X |
| 4,643,225 A | * | 2/1987 | Imhof | 137/596.17 |
| 4,860,792 A | * | 8/1989 | Ichihashi et al. | 137/596.17 |
| 5,385,171 A | * | 1/1995 | Cleasby | 137/596.17 X |

* cited by examiner

Primary Examiner—Gerald A. Michalsky
(74) Attorney, Agent, or Firm—Browdy and Neimark (57) ABSTRACT

The valve comprises a slider-valving member having two lateral valving elements (22, 22A, 22B) positioned on one and the other side of the transverse central plane, they being subjected to the direct action of thrust means (15) and movable axially between a first operative position defining said normal configuration of the slider-valving member (20, 20A, 20B), and a second operative position in which a further different communication condition between the channels is determined; spring means (23, 35, 45) are also provided, arranged to normally maintain the two lateral valving elements (22, 22A, 22B) in said first operative position. The said valve thrust means (15) are operated either individually or simultaneously, their action being such that when they act individually on the slider-valving member (20, 20A, 20B), this maintains its normal configuration, whereas when they act simultaneously on the lateral valving elements (22, 22A, 22B), these are moved into said second operative position against the action of the spring means (23, 35, 45).

5 Claims, 6 Drawing Sheets

DIRECTIONAL CONTROL VALVE

This invention relates to a directional control valve, comprising a valve body having a main bore on which there are provided a plurality of channels connected to respective fluid entry, exit and utilization passages. Within said main bore there is situated an axially movable slider-valving member arranged to assume a number of different axial positions relative to the main bore, of which one is normal and central; when in said axial positions, the slider-valving member determines that number of different conditions of communication between the channels, to control the flow direction. Finally, two thrust means (in particular two linear actuators with electromagnetic ON/OFF action) are applied to the respective ends of the slider-valving member, to act one at a time in order to move the slider-valving member about its central normal position, through a determined distance in a respective direction, to which a respective operative position corresponds.

A typical (though not exclusive) application of these valves is to operate the two operating chambers of double-acting hydraulic actuators.

These valves are able to assume not more than three different conditions of communication between the channels, corresponding to three positions of the slider.

A "normal" condition is obtained when both electromagnetic actuators are inactive; in this condition, the slider is in a central axial position by virtue of the action of spring means, and the centre channels (main passage for the pressurized fluid) are generally open and hence the entering fluid is set to discharge, whereas those channels ("users") connected to the two chambers of the hydraulic actuator are generally closed.

The other two conditions, which are mutually symmetrical, are obtained when the electromagnetic actuators move the side slider-valving member by acting one at a time; in this condition, the centre channels are closed, whereas one respective user is open to the entering fluid and the other user is connected to discharge.

A valve is known which uses three electromagnetic actuators, in order to obtain a fourth slider position and hence a corresponding fourth communication position, different from the others, to increase the operative facilities of the valve; for example to connect both the users to discharge while the centre channels are open.

However, the use of a third actuator involves higher production costs, greater electrical circuit complications, higher required and installed power, and greater overall size.

An object of this invention is to provide a valve of the aforedescribed type able to define a fourth communication condition while using only two electromagnetic actuators.

This and further objects are attained by the invention as characterised in the claims.

The invention is based on the fact that the slider-valving member comprises two valving elements positioned on one and the other side of the transverse central plane through said slider-valving member, these being subjected to the direct action of the thrust means and movable about this plane between a first operative position defining said normal configuration of the slider-valving member, and a second operative position in which a further different communication condition between the channels is determined, and spring means arranged to normally maintain the two lateral valving elements in said first operative position; moreover, said thrust means are operated either individually or simultaneously, their action being such that when they act individually on the slider-valving member, this maintains its normal configuration, whereas when they act simultaneously on the lateral valving elements, these are moved into said second operative position against the action of the spring means.

The invention is described in detail hereinafter with the aid of the accompanying figures, which illustrate one embodiment thereof by way of non-limiting example.

Reference will firstly be made to the first embodiment shown in FIGS. 1–4.

The valve shown comprises a valve body 10 having a main bore 11 on which there are provided a plurality of annular channels, coaxial with the bore 11 and opening into it, they being connected to respective fluid entry, exit and user passages.

In detail, in the illustrated embodiment, the following are provided, starting from the transverse central plane: three central annular channels E, connected to the so-called centre channels (not visible in the figures) through which the pressurized fluid passes from delivery to discharge; two annular channels P positioned to the two sides of the channels E and connected to two fluid pressure delivery ducts 12; two annular channels A and B positioned to the two sides of the channels P and connected to two user ducts 13 (in particular to the two chambers of a cylindrical actuator); two annular channels T positioned to the two sides of the channels A and B and connected to two fluid discharge ducts 14.

Obviously, the mutual arrangement of said channels can be different from that described.

Within the main bore 11 there is situated an axially movable slider-valving member 20 having a profiled lateral surface comprising cylindrical portions (indicated overall by 25) having a diameter equal to that of the bore 11 in order to close the bore cross-section, and annular grooves (indicated overall by 26) which connect an annular channel to an adjacent one, depending on the axial position of the slider-valving member 20 within the bore 11.

Two thrust means 15, in particular two electromagnetically operated actuators, are fixed to the valve body 10 and are applied to the respective ends of the slider-valving member 20 to act one at a time, via a respective stem 16, in order to move the slider-valving member 20 about its normal position, through a determined distance in one direction or the other, to which a respective operative position corresponds.

According to the invention, the slider-valving member 20 comprises two lateral valving elements 22 positioned on one and the other side of the central plane, and movable about this plane between two end positions, and subjected to the direct action of the thrust means. In particular, the two lateral valving elements 22 are symmetrically equal about the central plane.

In the first embodiment, shown in FIGS. 1 to 4, the slider-valving member 20 comprises a central valving element 21, to the ends of which said two lateral valving elements 22 are secured such that they can be moved, relative to the central element 21, into the two said end positions.

Each lateral valving element 22 is positioned to the side of, and aligned, within the bore 11, with the central valving element 21, and is connected to this, for example by a pair of hooks 21a and 22a projecting axially from the central element 21 and from the lateral element 22 respectively. This connection enables the two elements 21 and 22 to move away from or towards each other through a determined distance (a relatively short distance: just a few millimetres), to define said end positions, namely a first position in which the two lateral valving elements 22 are at maximum distance from the central element 21 (and the slider-valving member 20 is in its extended configuration—FIGS. 1 and 2) and a second position in which the two lateral elements 22 are at minimum distance from the element 21 (and the slider-valving member 20 is in its retracted configuration—FIGS. 3 and 4).

The lateral surface of the central valving element 21 and of the lateral valving elements 22 acts as the valving means against the surface of the main bore 11; specifically (in the example illustrated in FIGS. 1 to 4) it comprises five cylindrical portions 25 and four grooves 26.

Two springs 23 are also provided, each acting between the valve body 10 and a respective lateral element 22, and arranged to normally maintain the two lateral elements 22 in the first operative position. In particular, the springs 23 are precompressed between the outer end of the relative lateral element 22 and a side of the channel T, and normally maintain the two lateral valving elements 22 at their maximum distance from the central element 21; they also normally maintain the entire slider-valving member 20 in a central axial position (as shown in FIGS. 1–4).

Figure 1:
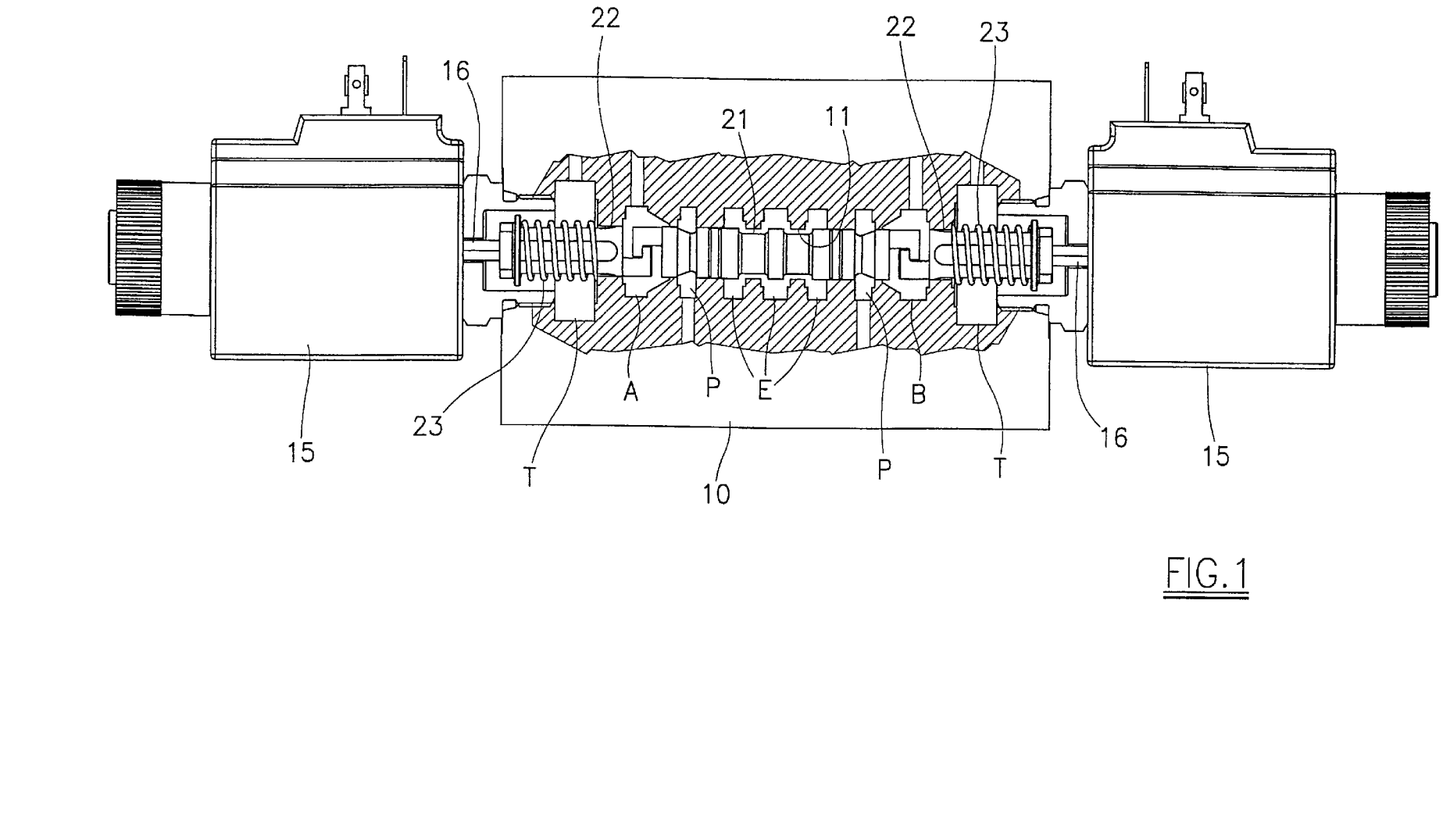
FIG. 1 is an axial section through the valve of the invention, in which the slider-valving member is in its normal configuration.
Figure 2:
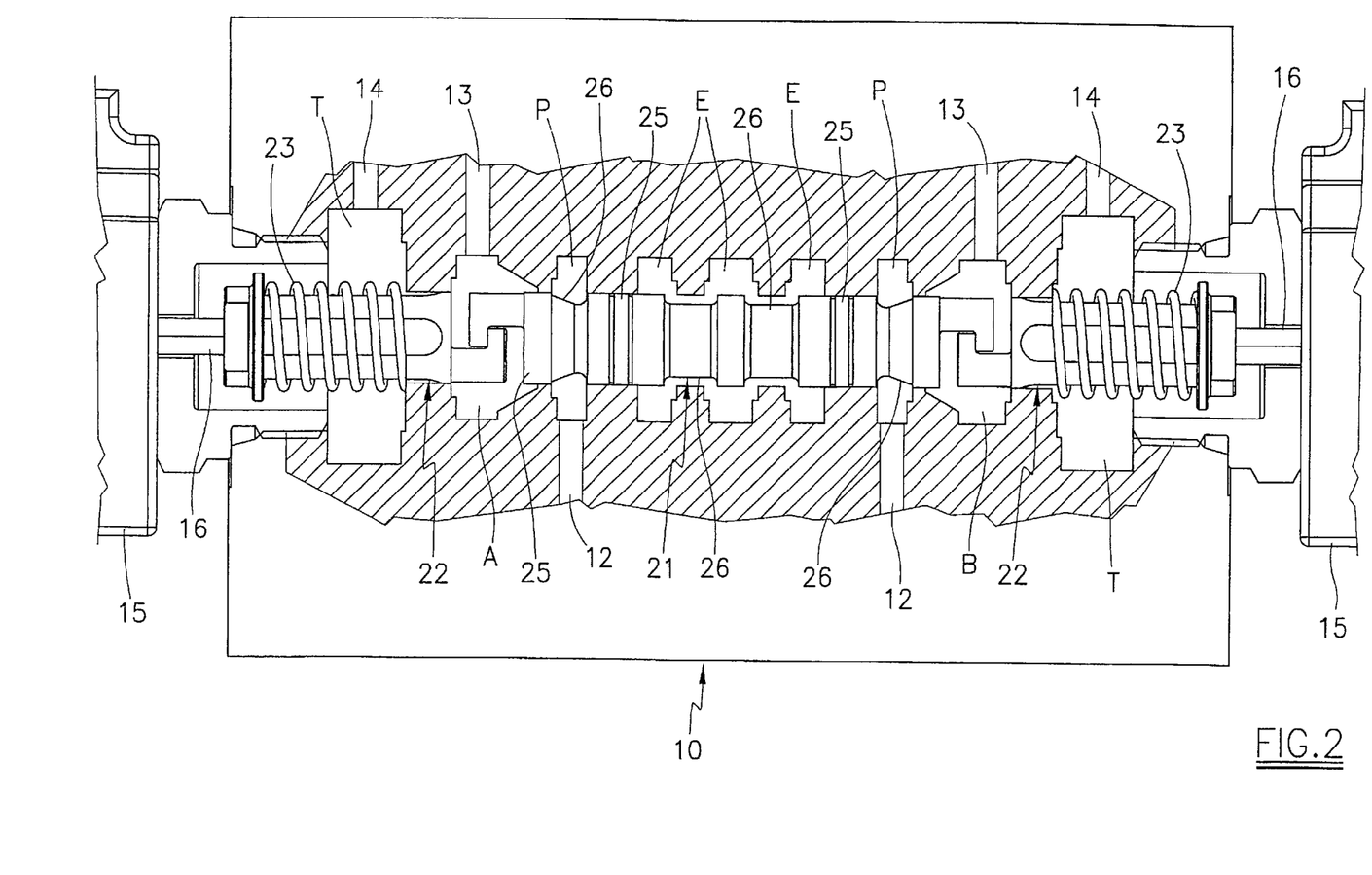
FIG. 2 is an enlarged detail of FIG. 1.

The first operative position of the lateral elements 22 defines the configuration in which the slider-valving member 20 is positioned normally (as shown in FIG. 1 and FIG. 2), in which the electromagnetic actuators 15 are inactive or when they act one at a time on the slider-valving member 20. In this respect, when the electromagnetic actuators 15 are inactive, the two springs 23 maintain the slider-valving member 20 in its extended configuration (and in a central axial position). When the left electromagnetic actuator 15 is activated (while the other electromagnetic actuator 15 is inactive), it moves its stem towards the right to consequently move the left lateral element 22, by overcoming the thrust of the respective spring 23. Consequently, the entire slider-valving member 20 is moved towards the right and, by virtue of the action of the right spring 23, is maintained in its extended configuration. The same thing happens when the right electromagnetic actuator 15 is activated (while the other electromagnetic actuator 15 is inactive).

Figure 3:
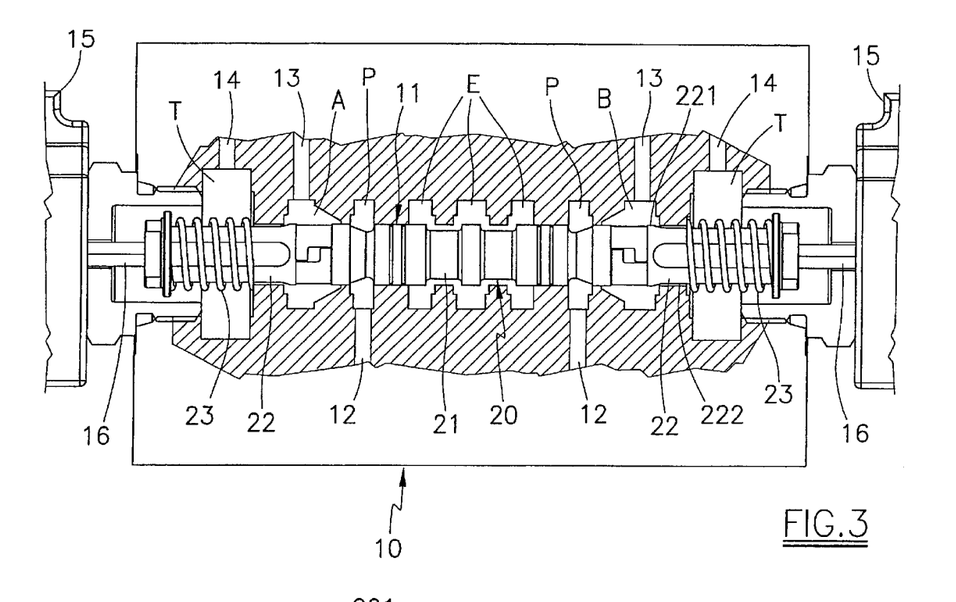
FIG. 3 is the same section as FIG. 2, in which the slider-valving member is in a second configuration.
Figure 4:
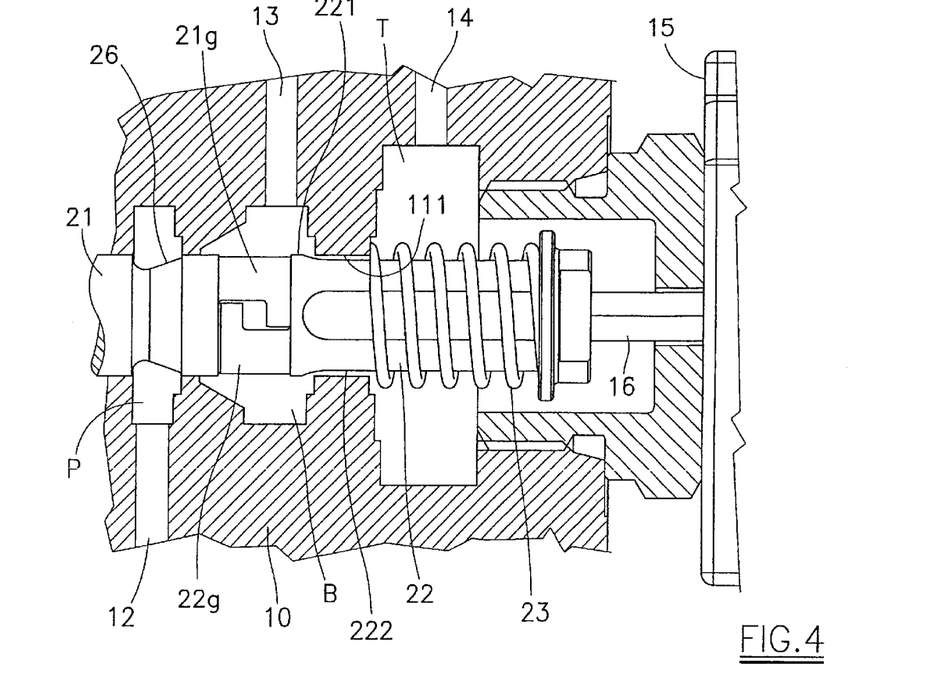
FIG. 4 is an enlarged detail of FIG. 3.

Consequently, when the means 15 act individually or are inactive, the valve of the invention acts as traditional valves and the slider-valving member 20 can assume three different axial positions (in which it always retains its extended configuration) to give rise to three conditions of communication between the channels, to control the direction of flow, typically a normal condition with the central channels E connected together (centre open) and the two users closed (FIG. 2), and two mutually symmetrical conditions in which the channels E are closed and one of the two channels A or B is connected to the nearby channel P while the other channel B or A is connected to the nearby channel T. According to the invention, the two thrust means 15 can be activated simultaneously, to produce the fourth axial position. When this occurs, they act simultaneously on the lateral elements 22, to move these, against the action of the springs 23, into said second operative position (minimum distance from the element 21, slider-valving member 20 in its retracted configuration), in which a further different condition of communication between the channels is determined (as shown in FIG. 3 and FIG. 4). In detail, each lateral valving element 22 axially involves two adjacent channels T and A/B, its lateral surface comprising a first axial portion 221 of maximum diameter, arranged to close the cross-section of the main bore 11 at its region 111 intermediate between the two channels T and A/B, and a second axial portion 222 of reduced diameter, arranged to allow fluid to pass along the intermediate region 111 of the bore 11. Said intermediate region 111 is encountered by the first axial portion 221 when the lateral valving element 22 is in one of said operative positions (for example the first position), and consequently communication between the channels A/B and T is closed (as shown in FIG. 2); it becomes encountered by the second axial portion 222 when the lateral element 22 is in the other of said operative positions, and consequently communication between the channels A/B and T is opened to obtain the said fourth position (as shown in FIG. 4). With the valve in this condition, the centre channels are open while the channels ("users") connected to the two chambers of the hydraulic actuator are both to discharge.

In the aforedescribed embodiment, the two electromagnetic actuators 15 each operate with compressive thrust action against the respective lateral valving element 22; however with suitable obvious modifications, the valve can operate in equivalent manner with means 15 each acting by tractive action on the respective lateral element 22.

Figure 5:
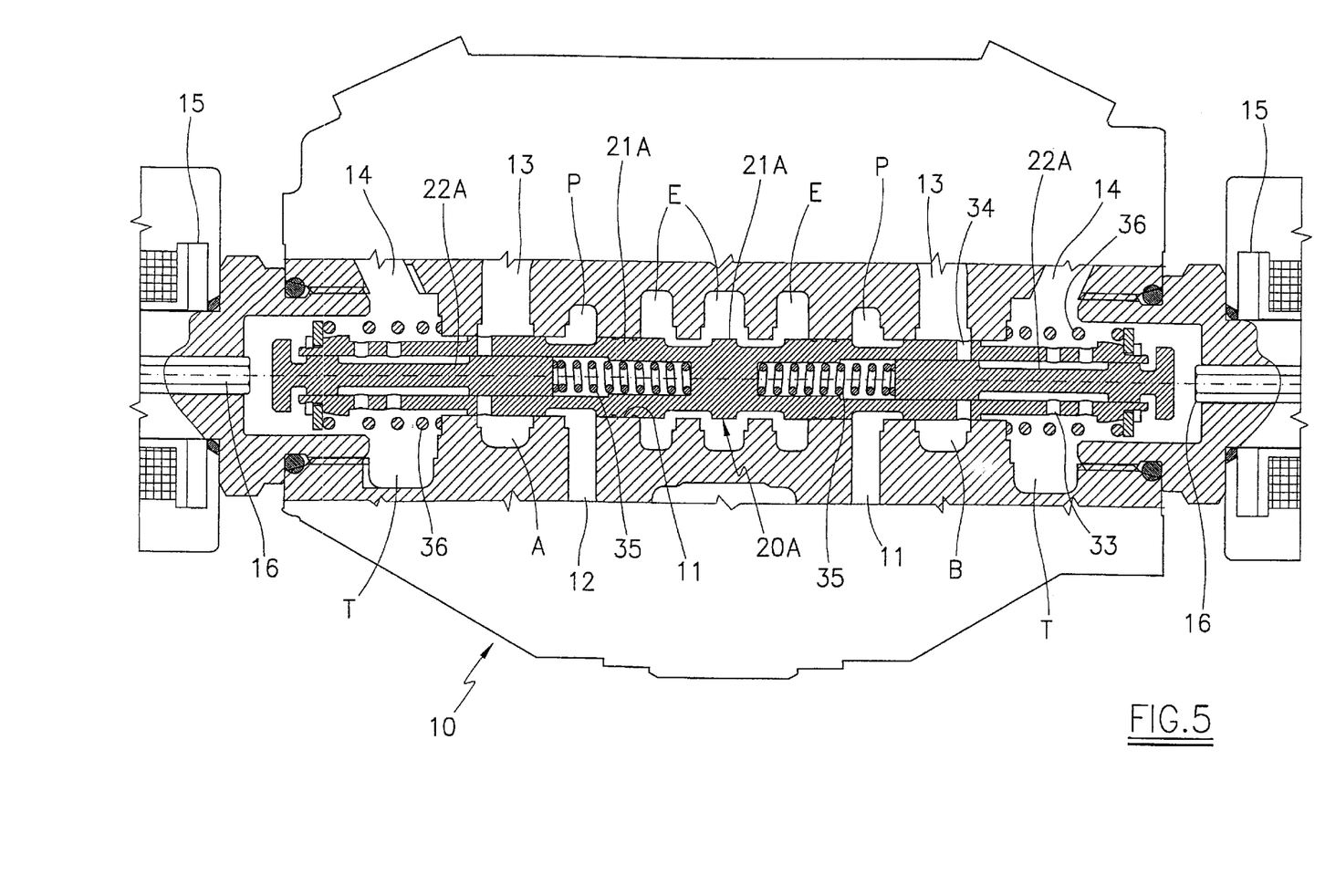
FIG. 5 is an axial section through a second embodiment of the invention.
Figure 5A:
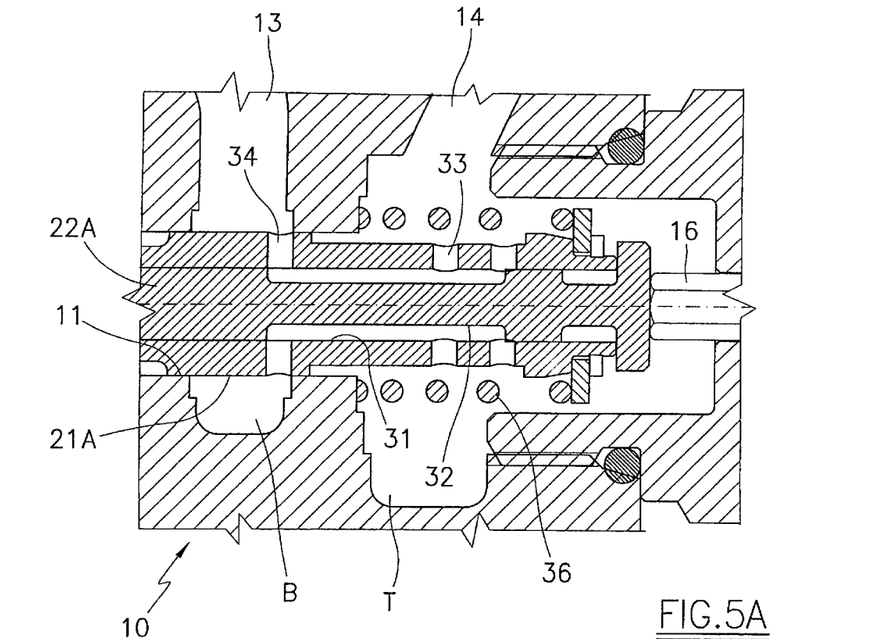
FIG. 5A is an enlarged detail of FIG. 5.

In the embodiment shown in FIGS. 5 and 5A, the slider-valving member 20 comprises a central valving element 21A having two end portions provided with respective axial cavities 31 opening at the respective end of the said element 21A. In each of the cavities 31 there is positioned a respective lateral valving element 22A engaging as an exact fit the lateral surface of the cavity 31, with the ability to slide axially. Each lateral valving element 22A presents an intermediate axial portion 32 of reduced diameter, arranged to define within the cavity 31 of the central element 21A an axial passage for the fluid.

On each end portion of the central valving element 21 there is provided a first radial passage 33 positioned to correspond with a channel T and a second radial passage 34 positioned to correspond with another channel A/B.

Two precompressed springs 35 are positioned in the cavities 31, between the inner end of the lateral elements 22A and the inner end of the cavities 31, to normally urge the elements 22A outwards, into the first operative position at maximum distance from the central element 21A (the slider-valving member 20A being in its extended configuration, as shown in FIG. 5). In contrast, when the elements 22A are urged towards the central plane, they attain the second operative position, in which they are at minimum distance from the element 21A (the slider-valving member 20A being in its retracted configuration, as shown in FIG. 5A).

Two second precompressed springs 36 are also provided, each acting between the valve body 10 and a respective lateral element 22A, and arranged to normally maintain the entire slider-valving member 20A in a central axial position. The resistant force provided by the intermediate springs 35 is much greater than that provided by the second springs 36.

When the electromagnetic actuators 15 are inactive, the two springs 35 maintain the slider-valving member 20A in an extended configuration whereas the springs 36 maintain it in a central axial position (as shown in FIG. 5). When the left electromagnetic actuator 15 is activated (while the other electromagnetic actuator 15 is inactive), it moves its stem towards the right to consequently move the left lateral element 22A, by overcoming the thrust of the left positioned spring 36, however the length of the spring 35 is not decreased (other than to a hardly relevant extent). Consequently, the entire slider-valving member 20A is moved towards the right while maintaining its extended configuration. The same thing happens when the right electromagnetic actuator 15 is activated (while the other electromagnetic actuator 15 is inactive).

When the two thrust means 15 are activated simultaneously to give rise to the fourth axial position, they act simultaneously on the lateral valving elements 22A, these being moved against the action of the springs 35 into said second operative position (slider-valving member 20A in its retracted configuration), in which a further different condition of communication between the channels is determined (as shown in FIG. 5A). However the springs 36 remain inactive, while maintaining the slider-valving member 20A in a centered position.

When the lateral valving element 22A is in one of said operative positions (for example the first position), the radial passage 34 is not connected to the intermediate portion 32 and is closed by the lateral surface of the lateral element 22A, with consequent closure of communication between the channels A/B and T. When however the lateral element 22A is moved into the other of said operative positions, both the radial passages 33 and 34 are connected to the intermediate portion 32, consequently opening communication between the channels A/B and T to obtain said fourth position (as shown in FIG. 5A). With the valve in this condition, the centre channels are open whereas the channels 13 ("users") connected to the two chambers of the hydraulic actuator are both to discharge.

Figure 6:
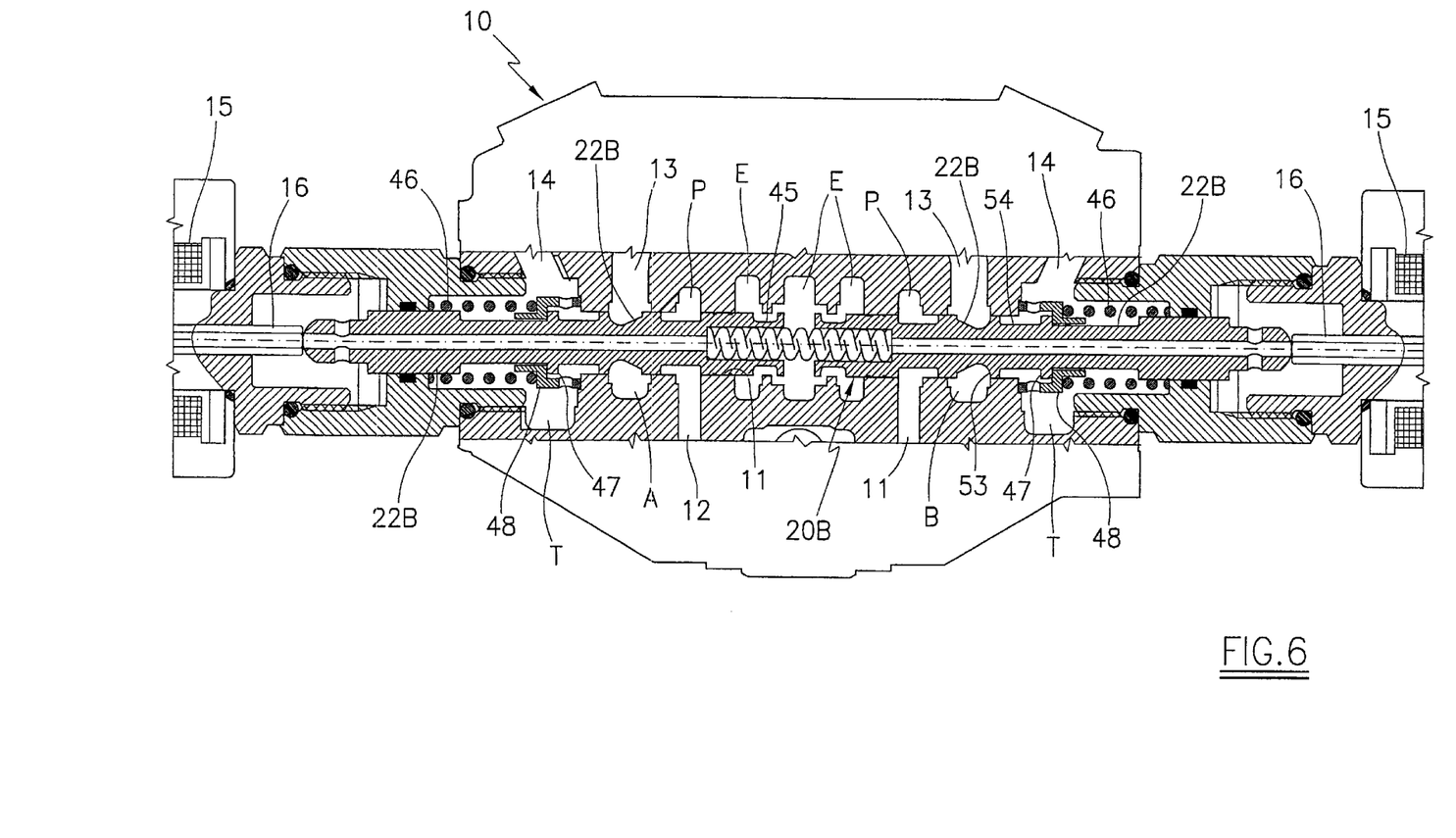
FIG. 6 is an axial section through a third embodiment of the invention.
Figure 6A:
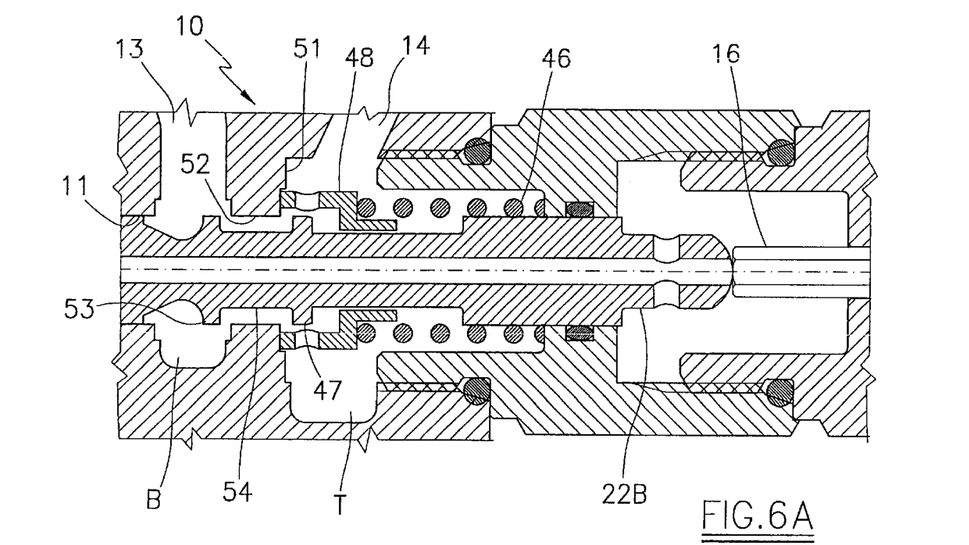
FIG. 6A is an enlarged detail of FIG. 6.

In the third embodiment, shown in FIGS. 6 and 6A, the slider-valving member 20B is without the central valving element and comprises only two lateral valving elements 22B, symmetrical about the central transverse plane and mutually movable in the axial direction within the main bore 11, and an intermediate spring 45 arranged to maintain the two lateral valving elements 22B at a determined distance apart. The two elements 22B can assume a first operative position in which they are at their maximum distance apart, determined in particular by the maximum extension of the intermediate spring 45 (the slider-valving member 20B is in its extended configuration—FIG. 6); and a second operative position, in which they are at their minimum distance apart, determined in particular by the minimum extension of the spring 45 (the slider-valving member 20B is in its retracted configuration FIG. 6A).

Two second precompressed springs 46 are also provided, each between the valve body 10 and a respective lateral element 22B, arranged to normally maintain the entire slider-valving member 20B in a central axial position. In particular, each spring 45 is precompressed between an end shoulder of the body 10 and a bush 48, slidable on the element 22B and resting against a radial projection extending from the respective lateral element 22B; the bush 48 is prolonged axially towards the central region of the bore 11, beyond the projection 47, to abut against a radial side 51 of the channel closest to the end of the slider-valving member 20B (channel T).

The resistant force provided by the intermediate spring 45 is much greater than that provided by the second springs 46, When the electromagnetic actuators 15 are inactive, the spring 45 maintains the slider-valving member 20B in its extended configuration, whereas the springs 46 maintain it in a central axial position, the bush 48 being in contact with the radial projections 47 and abutting against the respective radial sides 51. In these conditions, the springs 46 determine, via the bushes 48, the exactly central position of the slider-valving member 20B (as shown in FIG. 6).

When the left electromagnetic actuator 15 is activated (while the other electromagnetic actuator 15 is inactive), it moves its stem 16 towards the right to consequently move the left lateral element 22B, by overcoming the thrust of the left positioned spring 46, however the length of the spring 45 is not decreased (other than to a very minor extent). Consequently, the entire slider-valving member 20B is moved towards the right while maintaining its extended configuration. The same thing happens when the right electromagnetic actuator 15 is activated (while the left electromagnetic actuator 15 is inactive).

When the two thrust means 15 are activated simultaneously to give rise to the fourth axial position, they act simultaneously on the lateral valving elements 22B, these being moved against the action of the springs 46 into said second operative position (ie they move towards each other and the slider-valving member 20B assumes its retracted configuration), in which a further different condition of communication between the channels is determined (as shown in FIG. 6A). However the springs 46 remain inactive.

In detail, each lateral valving element 22B possesses a first axial portion 53 of maximum diameter, arranged to close the cross-section of the main bore 11 at its region 52 intermediate between the two channels T and A/B, followed by a second axial portion, positioned closer to the outer end, and of reduced cross-sectional diameter to allow axial passage of the fluid. When the slider-valving member 20B is in its normal (extended) configuration and in a central position, said intermediate region 52 is encountered by the first axial portion 53, and consequently communication between the channels A/B and T is closed (as shown in FIG. 6); it becomes encountered by the second axial portion 54 when the lateral element 22B is in the other of said operative positions, and consequently communication between the channels A/B and T is opened to obtain the said fourth position (as shown in FIG. 6A). With the valve in this condition, the centre channels are open while the channels ("users") connected to the two chambers of the hydraulic actuator are both to discharge.

In the aforedescribed second and third embodiments, the two electromagnetic actuators 15 each operate with a compressive thrust action against the respective lateral valving element 22A and 22B; however with suitable obvious modifications, the valve can operate in equivalent manner with means 15 each acting by tractive action on the respective lateral element 22A and 22B.

Typically, the thrust means 15 are solenoid-operated electromagnetic actuators of ON-OFF type. However said means can be of different type, for example: solenoids of proportional type which permit an indeterminate number of positions of the stem 16; or linear actuators which operate the stems 16 by an electric motor plus mechanical action (for example rack-pinion, or a male-female screw combination).

Numerous modifications of a practical and applicational nature can be made to the invention, but without deviating from the scope of the inventive idea as claimed below.

What is claimed is:

1. A directional control valve comprising:
    a valve body having a main bore on which there are provided a plurality of channels connected to respective fluid entry, exit and utilization passages, a slider-valving member (20, 20A, 20B) axially movable within said main bore, to assume a number of different axial positions, of which one is a central normal position, and having a normal configuration by which, when in said axial positions, it determines that number of different conditions of communication between the channels, to control the flow direction, two thrust means (15) applied to the respective ends of the slider-valving member (20, 20A, 20B), to act one at a time in order to move the slider-valving member about its central normal position, through a determined distance in a respective direction, to which a respective operative position corresponds, characterized in that the slider-valving member comprises two lateral valving elements (22, 22A, 22B) positioned on one and the other side of the transverse central plane through said slider-valving member (20, 20A, 20B), these being subjected to the direct action of the thrust means (15). and movable axially between a first operative position defining said normal configuration of the slider-valving member (20, 20A, 20B), and a second operative position in which a further different communication condition between the channels is determined, and spring means (23, 35, 45) arranged to normally maintain the two lateral valving elements (22, 22A, 22B) in said first operative position;

said thrust means (15) being operated either individually or simultaneously, their action being such that when they act individually on the slider-valving member (20, 20A, 20B), this maintains its normal configuration, whereas when they act simultaneously on the lateral valving elements (22, 22A, 22B), these are moved into said second operative position against the action of the spring means (23, 35, 45);

wherein the slider-valving member (20, 20A) comprises a central valving element (21, 21A), to the ends of which said two lateral valving elements (22, 22A) are secured such that they can be moved, relative to the central valving element (21, 21A), into the two said end positions.

2. A valve as claimed in claim 1, characterised in that each lateral valving element (22) is positioned to the side of, and aligned with, the central valving element (21), and is connected to this in such a manner as to be able to move away from or towards it to define said end positions, there being provided two springs (23), each acting between the valve body and a respective lateral element, and arranged to normally maintain the two lateral elements (22) in said first operative position, the lateral surface of the lateral valving elements (22) acting as the valving means against the surface of the main bore.

3. A valve as claimed in claim 1, characterised in that each lateral valving element (22) axially involves two adjacent channels, its lateral surface comprising a first axial portion (221) of maximum diameter, arranged to close the cross-section of the main bore (11) at its region (111) intermediate between two channels (T and A/B), and a second axial portion (222) of reduced diameter, arranged to allow fluid to pass along said intermediate region (111) of the bore (11), said intermediate region (111) being encountered by the first axial portion (221) when the lateral valving element (22) is in one of said operative positions, and being encountered by the second axial portion (222) when the lateral valving element (22) is in the other of said operative positions.

4. A valve as claimed in claim 1, characterised in that: the central valving element (21A) comprises two end portions provided with respective axial cavities (31) opening at the respective end of the said central element (21A), in each of which there is positioned a respective lateral valving element (22A) engaging as an exact fit the lateral surface of the cavity (31), with the ability to slide axially, each lateral valving element (22A) having an intermediate axial portion (32) of reduced diameter, arranged to define within the cavity (31) of the central element (21A) an axial passage for the fluid, on each end portion of the central valving element (21) there being provided a first radial passage (33) positioned to correspond with a channel (T) of the main bore and a second radial passage (34) positioned to correspond with another channel (A/B), said intermediate axial portion (32) being connected to both radial passages (33, 34) when the lateral valving element (22A) is in one of said operative positions, communication with both radial passages (33, 34) being excluded when the lateral valving element (22A) is in the other of said operative positions.

5. A valve as claimed in claim 4, characterised by comprising two precompressed springs (35) positioned in the cavities (31), between the inner end of the lateral elements (22A) and the inner end of the cavities (31), to normally urge the elements (22A) outwards, into the first operative position, and two second precompressed springs (36), each acting between the valve body (10) and a respective lateral element (22A), and arranged to normally maintain the entire slider-valving member (20A) in a central axial position, the resistant force provided by the intermediate springs (35) being much greater than that provided by the second springs (36).

* * * * *